(12) United States Patent
Katou et al.

(10) Patent No.: US 9,573,536 B2
(45) Date of Patent: Feb. 21, 2017

(54) WIRE HARNESS ROUTING DEVICE FOR SLIDING SEAT

(71) Applicant: SUMITOMO WIRING SYSTEMS, LTD., Mie (JP)

(72) Inventors: Shinji Katou, Mie (JP); Tsutomu Ootani, Mie (JP); Yoshikazu Sakakibara, Mie (JP); Satoshi Ujita, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 15/037,806

(22) PCT Filed: Nov. 20, 2014

(86) PCT No.: PCT/JP2014/080739
§ 371 (c)(1),
(2) Date: May 19, 2016

(87) PCT Pub. No.: WO2015/087679
PCT Pub. Date: Jun. 18, 2015

(65) Prior Publication Data
US 2016/0288740 A1 Oct. 6, 2016

(30) Foreign Application Priority Data
Dec. 9, 2013 (JP) ................. 2013-254109

(51) Int. Cl.
*B60R 16/02* (2006.01)
*B60N 2/06* (2006.01)
(Continued)

(52) U.S. Cl.
CPC ............. *B60R 16/0215* (2013.01); *B60N 2/06* (2013.01); *B60N 2/44* (2013.01); *H02G 3/0475* (2013.01); *B60N 2002/0264* (2013.01)

(58) Field of Classification Search
CPC ... B60R 16/0207; B60R 16/0215; B60N 2/06; B60N 2/44; B60N 2002/0264; H02G 3/0475
See application file for complete search history.

(56) References Cited

U.S. PATENT DOCUMENTS

2005/0035622 A1* 2/2005 Tsubaki ............... B60N 2/0224
296/65.13
2006/0199416 A1* 9/2006 Tsubaki ............. B60R 16/0215
439/352

(Continued)

FOREIGN PATENT DOCUMENTS

JP  2007-276628  10/2007
JP  2008-167558   7/2008

(Continued)

OTHER PUBLICATIONS

Search Report issued by Japan patent office in Japan Patent Application No. PCT/JP2014/080739, dated Feb. 10, 2015.

*Primary Examiner* — Hoa C Nguyen
*Assistant Examiner* — Amol Patel
(74) *Attorney, Agent, or Firm* — Greenblum & Bernstein, P.L.C.

(57) ABSTRACT

A branch wire branching from a trunk wire of a floor harness routed to an automobile is used as a wire harness supplying power to the sliding seat. The wire harness is inserted within an extra length accommodation case, and in addition, the extra length accommodation case is fixated, facing downward, to a seat rail to which the sliding seat is slidably mounted, and is accommodated in a space below the seat rail. The wire harness U-turned within the extra length accommodation case is passed through the slider and extracted to a sliding seat side and connected to the seat harness within the sliding seat. A bottom portion of the slider is slidably mounted to a straight line direction slider sliding (Continued)

groove provided on a top end of the extra length accommodation case and a top portion of the slider is fixated to the sliding seat.

2 Claims, 7 Drawing Sheets

(51) Int. Cl.
  *H02G 3/04* (2006.01)
  *B60N 2/44* (2006.01)
  *B60N 2/02* (2006.01)

(56) References Cited

U.S. PATENT DOCUMENTS

| | | | | |
|---|---|---|---|---|
| 2007/0132265 A1* | 6/2007 | Tsukamoto | ........... | B60N 2/0155 |
| | | | | 296/65.03 |
| 2008/0142260 A1* | 6/2008 | Yamaguchi | .......... | B60N 2/0224 |
| | | | | 174/72 A |
| 2012/0024564 A1* | 2/2012 | Sekino | ................. | B60N 2/0705 |
| | | | | 174/68.3 |
| 2012/0162959 A1* | 6/2012 | Terada | ................. | B60N 2/0715 |
| | | | | 361/826 |
| 2013/0181512 A1* | 7/2013 | Terada | ................ | B60R 16/0215 |
| | | | | 307/10.1 |
| 2014/0339376 A1 | 11/2014 | Katou et al. | | |
| 2015/0360629 A1* | 12/2015 | Sekino | ................ | B60R 16/0215 |
| | | | | 174/68.3 |

FOREIGN PATENT DOCUMENTS

| JP | 2008-290596 | 12/2008 |
|---|---|---|
| JP | 2011-162134 | 8/2011 |
| JP | 2012-051494 | 3/2012 |

* cited by examiner

PRIOR ART

WIRE HARNESS ROUTING DEVICE FOR SLIDING SEAT

FIELD OF THE INVENTION

The present invention relates to a wire harness routing device for a sliding seat. Specifically, the present invention decreases an extra working length required for a wire harness.

BACKGROUND OF THE INVENTION

A wire harness, which supplies power to electrical components installed in a sliding seat mounted to an automobile, is connected to a floor harness. The wire harness supplying power to the sliding seat is operated in response to a front/back displacement of a seat, and therefore an extra length is provided to the wire harness, which is often absorbed at an extra length accommodation portion provided to a wire harness routing pathway by displacing and bending the wire harness.

An example of this kind of device routing a wire harness to a sliding seat is shown in FIGS. 12A and 12B in Japanese Patent Laid-open Publication No. 2011-162134 (Patent Literature 1), in which the present applicants provide a wire harness 200 inserted through a space within a seat rail 201 where wheels of the sliding seat are movably fitted, and an extra length accommodation case 203 of the wire harness is positioned on a floor at a front end of the seat rail 201, and the wire harness 200 is U-turned within the extra length accommodation case 203 and drawn out to be connected to the floor harness.

In the wire harness routing device, the wire harness 200 branching or connecting from the floor harness routed on the floor of the automobile is fixated to the extra length accommodation case 203 or the floor with a clamp 205 in a vicinity of an outlet of the extra length accommodation case 203 arranged on the floor side. The wire harness 200 fixated to the floor side is routed to the sliding seat through the extra length accommodation case 203 and the seat rail 201, and is connected to a seat harness wired within the sliding seat on a bottom surface side of the sliding seat.

As shown in FIG. 13, routing of the wire harness 200 from the floor side to the sliding seat side is performed by lifting a front end of a seat 301 of a sliding seat 300 to be slanted forward and creating a posture where the wire harness 200 can be attached to a bottom surface 301*f* of the seat 301. The distance between the bottom surface 301*f* of the sliding seat and a floor 400 of a vehicle body is longer than the distance when the seat 301 of the sliding seat 300 is in a proper horizontal position. Accordingly, the wire harness 200 length is a length required for the attachment work described above, and needs to be much longer than the length required at the time of actual use when the sliding seat is returned to a normal position.

RELATED ART

Patent Literature

Patent Literature 1: Japanese Patent Laid-open Publication No. 2011-162134

SUMMARY OF THE INVENTION

Problems to be Solved by the Invention

As noted above, when the wire harness 200 routed to the sliding seat is inserted through the extra length accommodation case 203 and the extra length accommodation case 203 is fixated to the floor, during attachment of the wire harness to the sliding seat, the length of the wire harness extracted from the extra length accommodation case 203 needs to be longer than the length after the attachment is complete, and therefore the wire harness 200 becomes large. Accordingly, the extra length accommodation case 203 becomes large, and concerns of cost increase and installation space arise, and also the increased length of the wire harness 200 tends to interfere with surrounding devices.

The present invention is conceived in light of the above concerns. The present invention improves an attachment performance by decreasing an extra working length of a wire harness for a sliding seat as much as possible, and in addition, restricts an increase in size of an extra length accommodation case, enabling use across different vehicle types.

Means for Solving the Problems

In order to resolve the above-noted circumstances, the present invention provides, as a first invention, a wire harness routing device for a sliding seat using a branch wire branching from a trunk wire of a floor harness routed in an automobile as a wire harness supplying power to the sliding seat. The wire harness is inserted into an extra length accommodation case and the extra length accommodation case is fixated, facing downward, to a seat rail to which the sliding seat is slidably mounted, and is accommodated in a space between front and back cross members of the automobile immediately below the seat rail and the extra length accommodation case is not arranged below a seat of the sliding seat. The extra length accommodation case is formed in a laterally oriented "J" shape and is provided with a straight line displacement portion on a top portion. In addition, the extra length accommodation case is curved at a front end below the straight line displacement portion and has a shape that includes a bypass extending to a center point in a backfold shape. The wire harness is inserted from the floor side to an opening provided at a lower rear end of the bypass. The wire harness U-turned within the extra length accommodation case passes through a slider and is drawn out toward the sliding seat side and is connected to a seat harness within the sliding seat. A lower portion of the slider is slidably mounted to a straight line direction slider sliding groove provided on a top end of the extra length accommodation case, and in addition, a top portion of the slider is fixated to the sliding seat. The wire harness passing through the extra length accommodation case and the slider is sheathed by a sheathing member of a caterpillar-type.

As noted above, the extra length accommodation case fixated, facing downward, to the seat rail is accommodated in a space between front and back cross members of the automobile, the extra length accommodation case is formed in a laterally oriented "J" shape and is provided with a straight line displacement portion on the top portion. In addition, the extra length accommodation case is curved at a front end below the straight line displacement portion and has a shape that includes a bypass extending to a center point in a backfold shape, and the wire harness is inserted from the floor side to an opening provided at a lower rear end of the bypass.

With the above configuration, the distance between the extra length accommodation case fixated to the seat rail in a suspended state facing downward and a wire harness attaching portion of the sliding seat becomes short, and therefore the extra working length of the wire harness can be decreased and mounting performance to the automobile can be improved. In addition, an empty space is formed below the seat rail and can be effectively utilized as a space to accommodate the extra length accommodation case. On the other hand, the extra length accommodation case is not installed on a bottom surface of the seat of the sliding seat, and therefore a space below the bottom surface of the seat of the sliding seat can be effectively utilized storing items and the like of a passenger. Furthermore, the extra length accommodation case is fixated to the seat rail and the slider slidably mounted to the extra length accommodation case is fixated to the sliding seat. Therefore, the extra length accommodation case can be mounted to the sliding seat and the seat rail of various vehicle types and can be used across different vehicle types.

In addition, the present invention provides, as a second invention, a wire harness routing structure for a sliding seat connecting to a floor harness in which a seat harness routed within the sliding seat mounted to an automobile is extended to an exterior and used as a wire harness supplying power to the sliding seat. The extra length accommodation case to which the wire harness is inserted and U-turned is fixated to the seat of the sliding seat, and is formed in a laterally oriented "J" shape and is provided with a straight line displacement portion on a bottom portion. In addition, the extra length accommodation case is curved at a rear end above the straight line displacement portion and has a shape that includes a bypass extending to a center point in a backfold shape. The wire harness continuous to the seat harness is inserted through the opening provided at an upper front end of the bypass. The slider to which the U-turned wire harness is inserted is slidably mounted to the slider sliding groove provided at a bottom end surface of the extra length accommodation case, and in addition, a connector connected to an end portion of the wire harness is fixated to a connector holder portion provided at a lower end of the slider. The lower portion of the slider is fixated to the seat rail on which the sliding seat is slidably mounted and the connector of the end portion of the wire harness within the connector holder portion of the lower end of the fixated slider is connected to a connector of the floor harness. The wire harness passing through the extra length accommodation case is sheathed by a sheathing member of a caterpillar-type.

The wire harness routing device for the sliding seat according to the second invention is provided extending the seat harness wired within the sliding seat, not provided extending the wire harness supplying power to the sliding seat to the floor harness. In addition, the extra length accommodation case accommodating the extra length of the wire harness is fixated to the sliding seat, not to the seat rail; the slider is fixated to the seat rail, not to the sliding seat; and the extra length accommodation case and fixating members of the slider are reversed from the first invention.

Similar to the first invention, the configuration of the second invention enables the distance between the seat rail and the extra length accommodation case fixated to the sliding seat to be shortened, and because the distance between the seat rail and the floor is short, the extra working length of the wire harness can be decreased and mountability to the automobile can be improved. Furthermore, the slider is fixated to the seat rail and the extra length accommodation case is fixated to the sliding seat, enabling mounting to the sliding seat and the seat rail of various vehicle types and enabling use across different vehicle types.

In the first and second inventions, as noted above, a sheathing member of a caterpillar-type sheathes a group of wire configuring the wire harness connecting the seat harness within the sliding seat and the floor harness and passing through the extra length accommodation case and the slider. The sheathing member includes a flat plate having a strip shape, the flat plate including a plurality of bend lines extending in a length direction and provided at intervals in a width direction. The bend lines bend to create a quadrangular cylinder. In addition, due to slits provided in the width direction, at intervals in the length direction, the sheathing member is connected in a state where a first side of the cylinder separates while a second side is continuous, and the first side of the cylinder bends whereas the second side does not bend.

Effect of the Invention

The first invention has a configuration in which the extra length accommodation case through which the wire harness is inserted is fixated, facing downward, to the seat rail and the slider is fixated to the sliding seat. Therefore, the distance between the extra length accommodation case fixated downward to the seat rail and the wire harness attaching portion of the sliding seat becomes short and the extra working length of the wire harness can be decreased and the mountability to the automobile can be improved. In addition, the empty space is formed below the seat rail and can be effectively utilized as the space to accommodate the extra length accommodation case. The extra length accommodation case is not installed on the bottom surface of the seat of the sliding seat, and therefore the space below the bottom surface of the seat of the sliding seat can be effectively utilized.

In the second invention, contrary to the first invention, the extra length accommodation case is fixated to the sliding seat and the slider is fixated to the seat rail. With such a configuration, similar to the first invention, the distance between the extra length accommodation case fixated to the sliding seat and the seat rail is short and the distance between the seat rail and the floor is also short, and therefore the extra working length of the wire harness can be decreased and the mountability to the automobile can be improved. Furthermore, the slider is fixated to the seat rail and the extra length accommodation case is fixated to the sliding seat, enabling mounting to the sliding seat and the seat rail of various vehicle types and use across the various vehicle types.

BRIEF DESCRIPTION OF THE DRAWINGS

FIG. 6A is a perspective view, and FIG. 6B illustrates a state where the slider is fitted with a slider sliding groove.

MODE FOR CARRYING OUT THE INVENTION

Figure 4A:
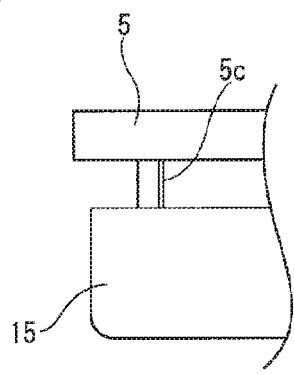
FIG. 4A is a schematic front view illustrating a portion connecting to a seat rail.
Figure 4B:
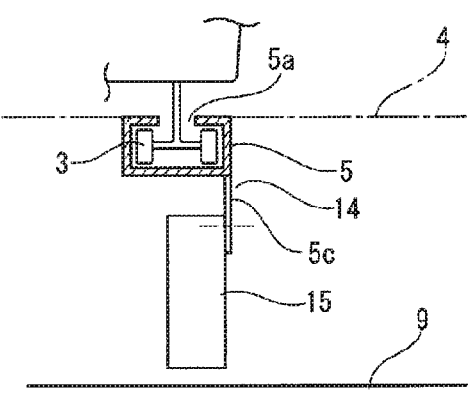
FIG. 4B is a schematic side view.

Hereafter, embodiments of the present invention are described with reference to the drawings. FIGS. 1 through 8 illustrate a first embodiment of the present invention. As shown in FIG. 4B, a sliding seat 1 installed in an automobile is provided with wheels 3 mounted to a support axis projecting from a bottom surface of a seat 2, and the wheels 3 are fitted so as to slide in a front/back direction to a fitting groove 5a of a seat rail 5 positioned so as to be exposed on a flooring material 4 of a vehicle interior.

Figure 1:
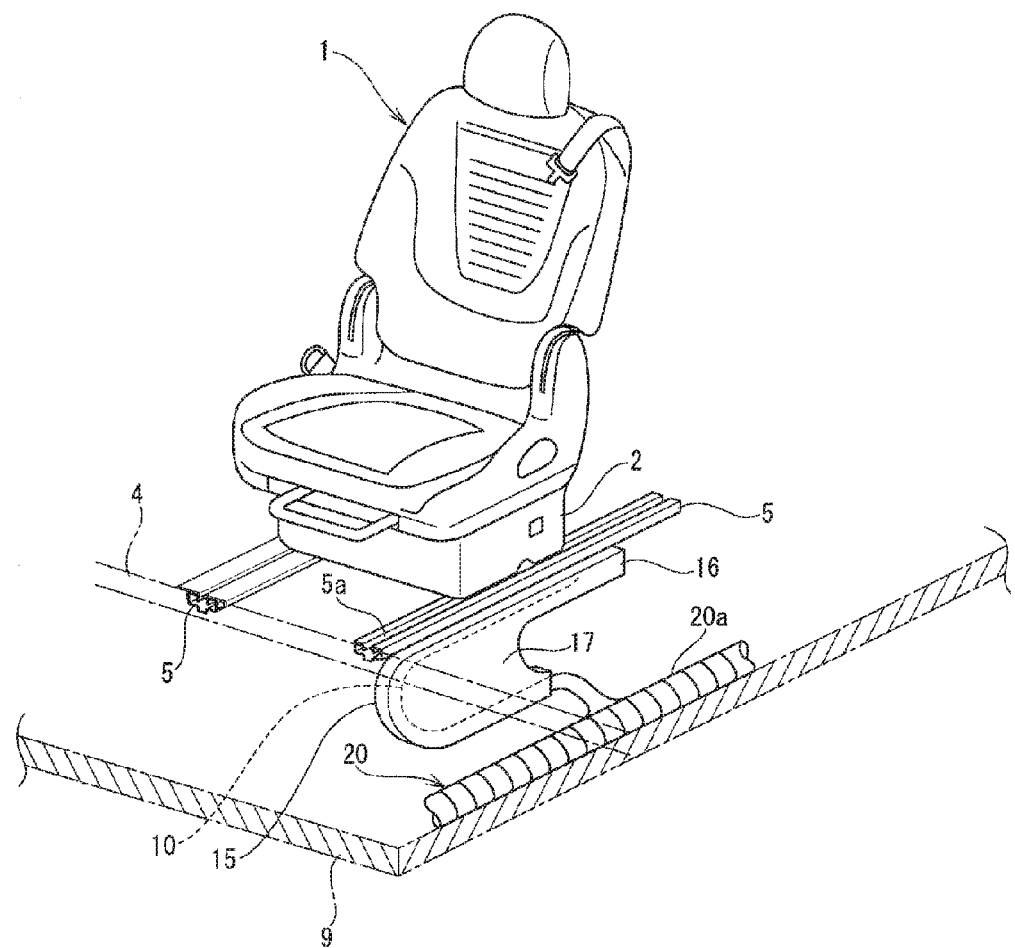
FIG. 1 is a perspective view illustrating a sliding seat according to a first embodiment of the present invention.
Figure 2:
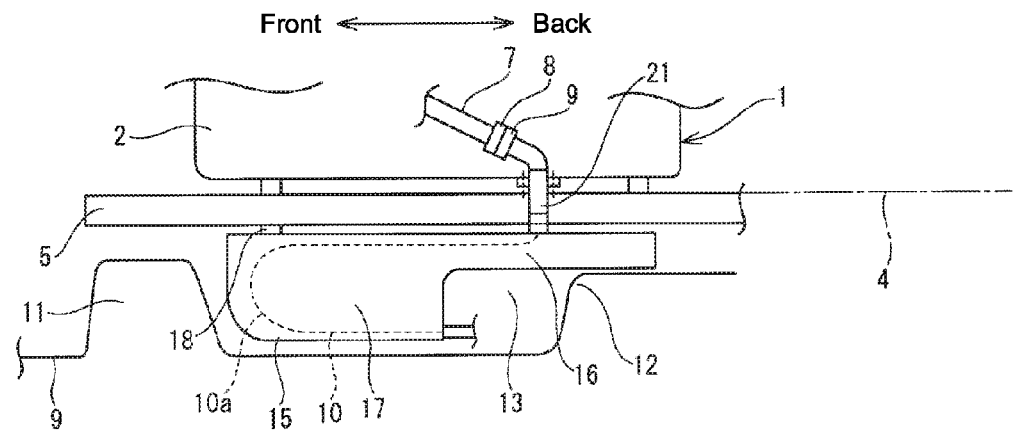
FIG. 2 is a side view of a main portion of the first embodiment.
Figure 3:
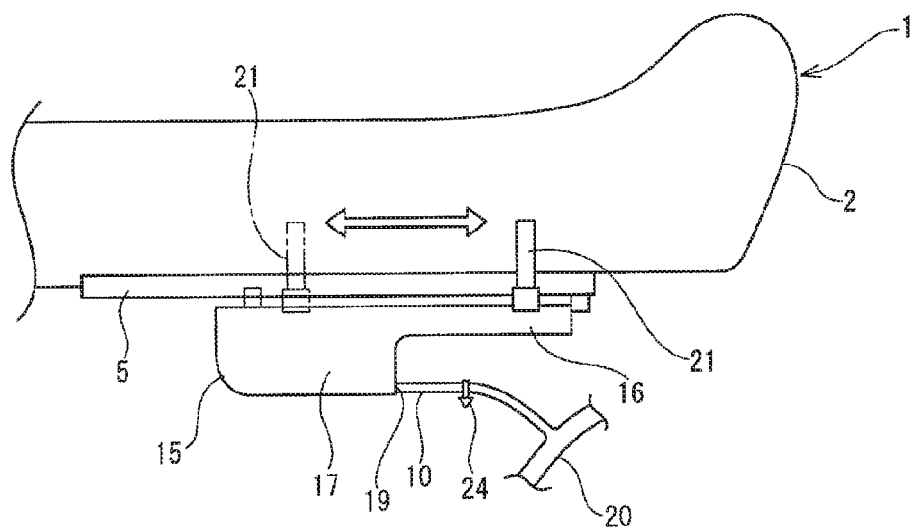
FIG. 3 is an enlarged view of a main portion of FIG. 2.

As shown in FIG. 2, a seat harness 7 is arranged within the seat 2 as a power supply to electric components installed in the sliding seat 1, and a connector 8 connected to a terminal of the seat harness 7 is arranged on a bottom surface side of the seat 2. As shown in FIG. 1, a wire harness 10 configured by a branch wire branching from a trunk wire 20a of a floor harness 20 routed along a floor panel 9 of a floor plate of a vehicle body is arranged toward the sliding seat 1 side, and a connector 9 connected to a terminal of the wire harness 10 is fitted to the connector 8 of the terminal of the seat harness and power is supplied from the floor harness 20 to the sliding seat 1. The sliding seat 1 slides in the front/back direction, and therefore provides an extra length to the wire harness 10 branching from the floor harness 20 and follows a front/back displacement of the sliding seat 1.

The flooring material 4 of the vehicle interior where the seat rail 5 is installed is arranged in a state where a top surface of a recess portion between front/back cross members 11 and 12 provided on the floor panel 9 is closed, and therefore a space 13 is created below the seat rail 5. Below the seat rail 5, an extra wire length accommodation case 15 (hereafter referred to as an extra length accommodation case 15) through which the wire harness 10 is movably inserted is fixated in a suspended state, and the extra length accommodation case 15 is installed in the space 13 below the seat rail 5. Specifically, the space 13 below the seat rail 5 is used as a space to install the extra length accommodation case 15.

Figure 4C:
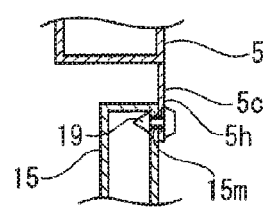
FIG. 4C is a cross-sectional view illustrating a state where an extra wire length accommodation case is attached to the seat rail.
Figure 5:
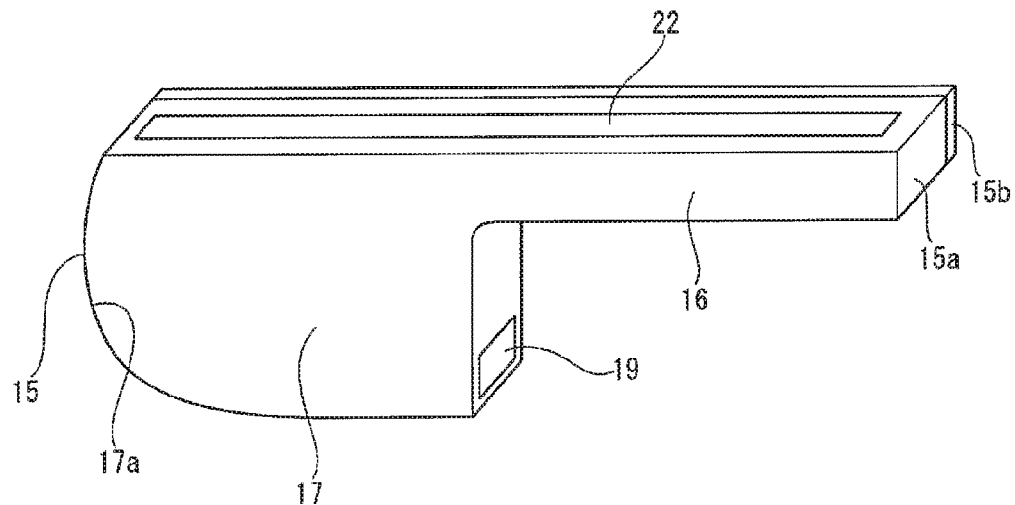
FIG. 5 is a perspective view illustrating the extra length accommodation case.

As shown in FIG. 5, the extra length accommodation case 15 is formed in a laterally oriented "J" shape and has a configuration in which a side surface opening of a main body 15a having a shallow base is closed with a lid 15b. The extra length accommodation case 15 provides a straight line displacement portion 16 on a top portion and a bypass 17 below the straight line displacement portion 16. The bypass 17 is curved at a front end and extends to a center point in the front/back direction in a backfold shape. As shown in FIG. 4C, a clamp engagement hole 15m is provided on an outer wall of the extra length accommodation case 15, and a clamp 19 mounted to an engagement hole 5h provided to an attaching portion 5c projecting from a bottom surface of the seat rail 5 is inserted and engaged to the clamp engagement hole 15m and fixated, fixating the extra length accommodation case 15 to the seat rail 5 in the suspended state. Further, a bolt and a nut may be used in place of the clamp.

Figure 6A:
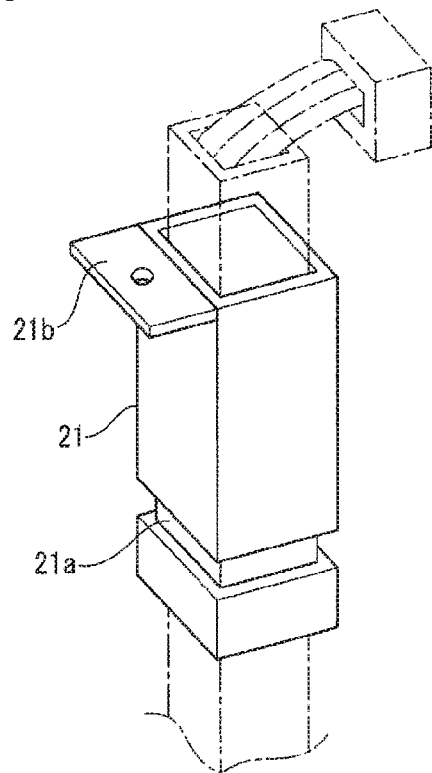
FIGS. 6A and 6B illustrate a slider, where
Figure 6B:
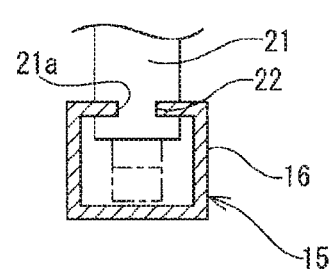

The length of the straight line displacement portion 16 on the top portion of the extra length accommodation case 15 has a length accommodated in the space between the front/back cross members 11 and 12. As shown in FIGS. 6A and 6B, a slider sliding groove 22 to which a slider 21 is slidably mounted is provided along an entire length of a top end surface of the straight line displacement portion 16. In addition, an entrance 19 for the wire harness is provided at a lower rear end of the bypass 17 on the bottom portion. The entrance 19 is provided close to a front side surface of the back cross member 12 and a band clip 24 mounted to the wire harness 10 branching from the floor harness 20 is inserted and engaged to an engagement hole provided to a front side bottom portion of the back cross member 12, fixating the wire harness 10 to the back cross member 12.

The wire harness 10 inserted, from the entrance 19, to the bypass 17 of the extra length accommodation case 15 moves forward along a lower wall of the bypass 17 and reaches the straight line displacement portion 16 in the top portion by bending upward at a front end arced portion 17a and advances to a rear direction within the straight line displacement portion 16. The wire harness 10 passes through the slider 21 at a predetermined position, draws out toward the seat 2 side of the sliding seat 1, and connects to the seat harness 7 via the connectors 9 and 8.

The slider 21 spanning the wire harness 10 between the extra length accommodation case 15 fixated to the seat rail 5 and the sliding seat 1 sliding forward and backward, as shown in FIGS. 6A and 6B, is a squared tubular shape extending in a vertical direction and having an opening at both top and bottom ends. In addition, the slider 21 includes, at the bottom portion, a fitting groove 21a slidably fitted to two side edges of the slider sliding groove 22 of the extra length accommodation case 15 and, at the top portion, an attaching portion 21b attaching to the sliding seat 1. The attaching portion 21b is fastened and fixated to the seat 2 with a bolt and nut.

As noted above, the slider 21 fixated to the seat 2 of the sliding seat 1 moves front and back accompanying the front/back displacement of the sliding seat 1 and the slider 21 moves front and back along the slider sliding groove 22 of the extra length accommodation case 15 fixated to the seat rail 5. The wire harness 10 passing through the slider 21 moves front and back accompanying the slider 21, and advances forward within the straight line displacement portion 16 of the extra length accommodation case 15 when the sliding seat 1 moves forward, and a front end bending portion 10b of the wire harness 10 approaches the front end of the bypass 17. In addition, the wire harness 10 retracts within the straight line displacement portion 16 when the sliding seat 1 retracts and the front end bending portion 10b of the wire harness 10 retracts within the bypass 17. In this way, the wire harness 10 can be displaced accompanying the front/back displacement of the sliding seat 1.

Figure 7A:
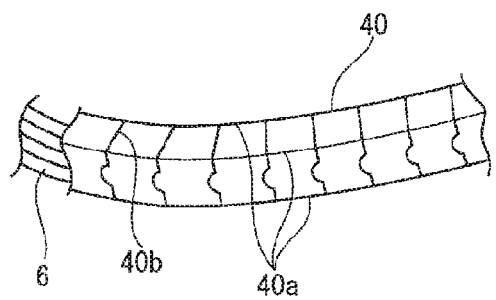
FIG. 7A is a perspective view of a state where a wire harness is sheathed by a sheathing member.
Figure 7B:
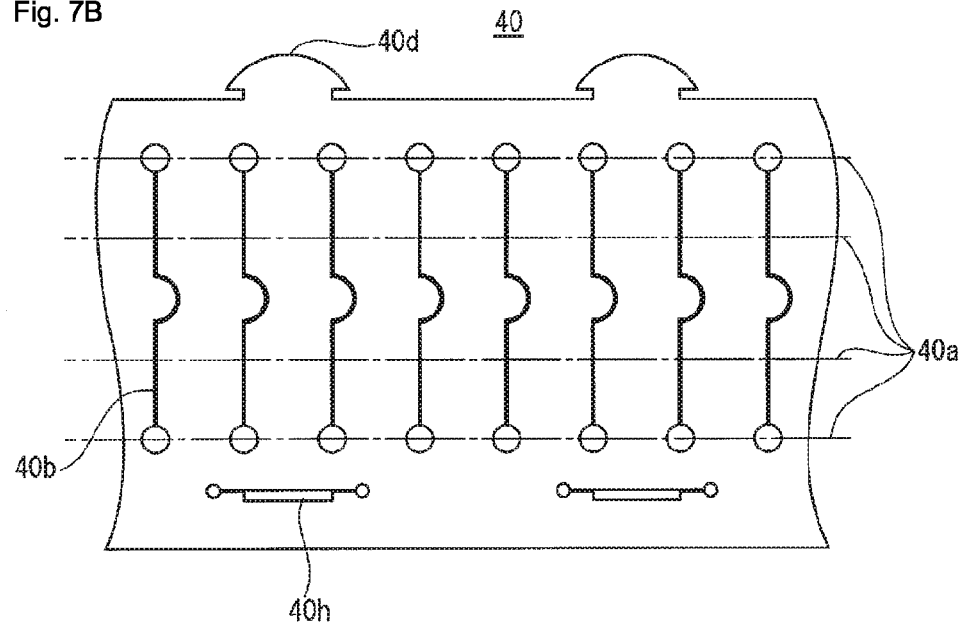
FIG. 7B is a development view of the sheathing member.

As shown in FIGS. 7A and 7B, the wire harness 10 is sheathed by a sheathing member 40 and drawn out toward the sliding seat 1 through the extra length accommodation case 15 and the slider 21. The sheathing member 40 is configured by a caterpillar-type protector of an assembly type described in Japanese Application No. 2012-278727, which is an earlier application of the inventors of the present invention. As shown in FIG. 7B, the sheathing member 40 includes a flat plate having a strip shape, the flat plate including four bend lines 40a extending in a length direction and provided at intervals in a width direction. In this state, an engagement piece 40d projecting from a first end side in the width direction is inserted and engaged to an engagement hole 40n provided on a second end side and creates a quadrangular cylinder. In this assembled state, slits 40b are provided in the width direction, at intervals in the length direction, such that an outer circumferential side of the cylinder separates while an inner circumferential side is continuous, connecting the sheathing member 40 in a state where the outer circumferential side bends whereas the inner circumferential side does not bend. In a state where the wire harness 10 is sheathed by the sheathing member 40, two side surfaces are displaced in contact with the bottom surface of the main body 15a and the lid 15b within the extra length accommodation case 15. The wire harness 10 is held in a stable position inside the extra length accommodation case 15 and can be smoothly displaced.

Assembly of the wire harness and attachment to the sliding seat 1 installed in the automobile is described below with reference to FIG. 8. First, the extra length accommodation case 15 and the slider 21 are mounted, at a wire harness assembly plant, to the wire harness 10 which is the branch wire branching from the trunk wire of the floor harness 20.

First, at an automobile assembly plant, the floor harness 20 is routed on the floor panel 9 of the automobile and the wire harness 10 branching from the trunk wire 20a of the floor harness 20 is fixated to the back cross member 12 via the band clip 24. Next, the wire harness 10 is mounted to the sliding seat 1 in a process shown in FIG. 8.

The seat rail 5 is positioned between the front and back cross members 11 and 12 of the automobile, and the wheels 3 of the sliding seat 1 are slidably fitted to the seat rail 5, and the seat rail 5 and the sliding seat 1 are integrated. As shown in FIG. 8, top end sides of the seat rail 5 and the sliding seat 1 are lifted and the wire harness 10 and the extra length accommodation case 15 positioned below the seat rail 5 are readily fixated to the seat rail 5 and the seat 2.

In this state, as shown in FIGS. 4B and 4C, the top portion of the extra length accommodation case 15 is fixated via the clamp 19 to the attaching portion 5c projecting downward of the seat rail 5. In addition, the attaching portion 21b on the top end of the slider 21 projecting from the top end of the extra length accommodation case 15 is fastened and fixated to the seat 2, and the connector 9 is fitted to the connector 8 of the seat harness 7, the connector 9 being provided to a forefront end of the wire harness 10 extracted from the top end opening of the slider 21.

Figure 8:
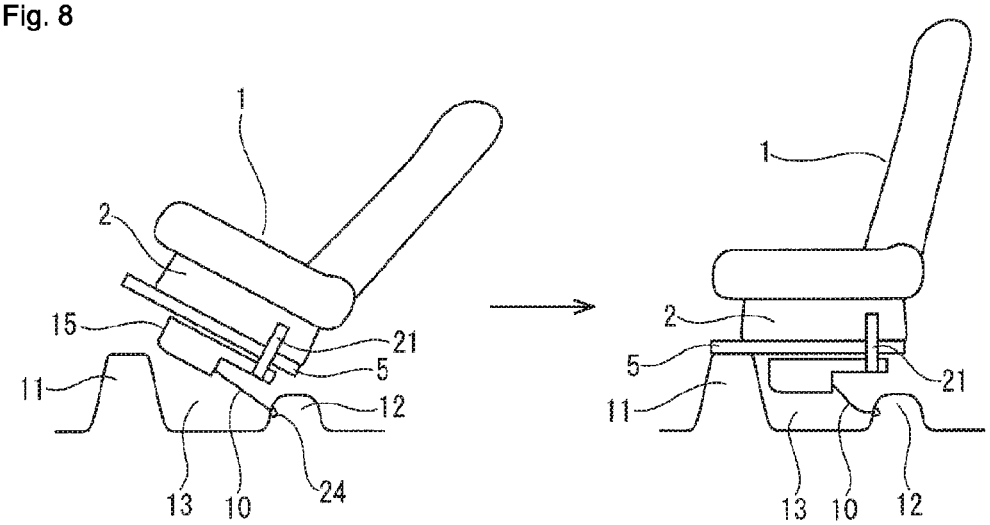
FIG. 8 illustrates a state where the wire harness is mounted to the sliding seat.
Figure 9:
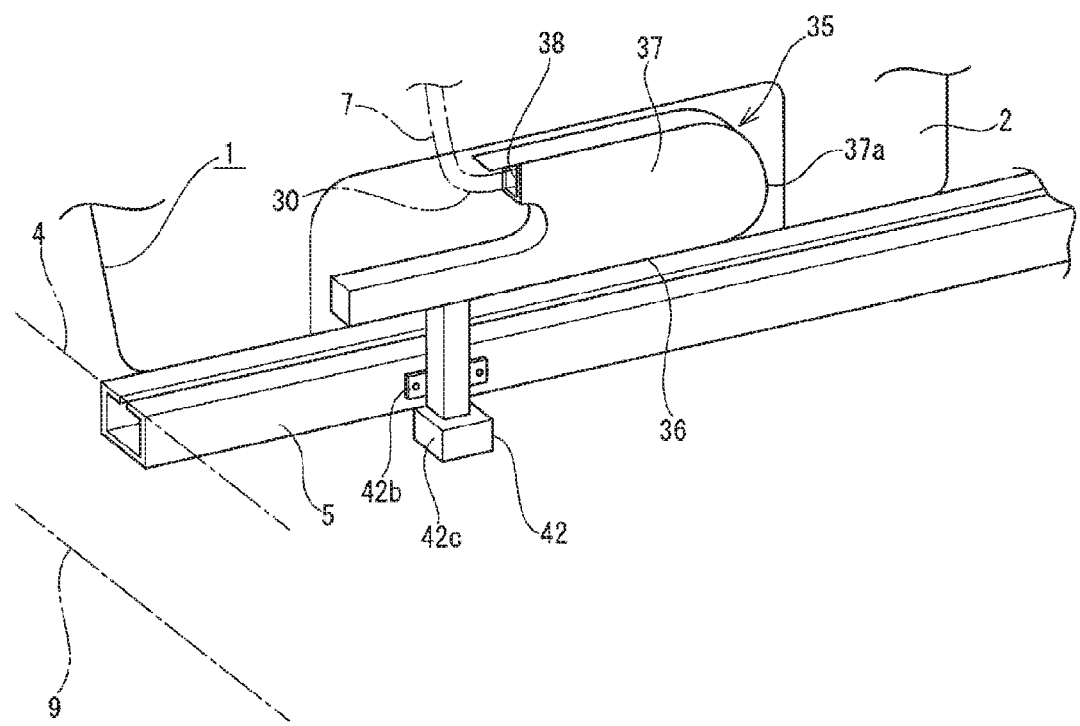
FIG. 9 is a perspective view of a main portion of a second embodiment.

As noted above, the extra length accommodation case 15 is fixated to the seat rail 5, the slider 21 is fixated to the seat 2, and the wire harness 10 is connected via the connector to the seat harness 7, then the seat rail 5 and the sliding seat 1 are returned to an original horizontal state as shown in FIG. 8. Thereafter, the flooring material 4 of the vehicle interior is attached in a state where a wheel fitting portion of the seat rail 5 is exposed. In this state, the extra length accommodation case 15 is accommodated in the space 13 between the front and back cross members 11 and 12 immediately below the seat rail 5.

When the wire harness 10 supplying power to the sliding seat 1 is routed as described above, the extra length accommodation case 15 is arranged below the seat rail 5. Therefore, when the seat rail 5 is tilted upward and the extra length accommodation case 15 is fixated to the seat rail 5, the length of the wire harness between the extra length accommodation case 15 and the side fixated to the floor can be shortened, and the distance from the top end of the extra length accommodation case 15 to the seat 2 can be shortened. Further, by arranging a pathway of the wire harness 10 on the floor side from the rear of the automobile, the extra working length of the wire harness 10 during mounting to the sliding seat 1 can be shortened and the mountability to the automobile can be improved. In addition, the sliding seat 1 and the seat rail 5 are fixated to the slider 21 and the extra length accommodation case 15, and therefore the wire harness can be used across different vehicle types. Furthermore, the empty space 13 immediately below the seat rail 5 can accommodate the extra length accommodation case 15 and the empty space can be effectively utilized.

FIGS. 9 through 11B illustrate a second embodiment of the present invention. In the first embodiment, the wire harness 10 configured by the branch wire branching from the trunk wire of the floor harness is used to supply power for the sliding seat. However, in the second embodiment, a wire harness 30 having an extra length by extending the seat harness 7 routed within the sliding seat 1 is provided continuously and the wire harness 30 is connected via the connector to a branch wire 20b of the floor harness 20.

The wire harness 30 provided by extending a group of electric wires belonging to the seat harness 7 is inserted through an extra length accommodation case 35 fixated to the bottom surface of the seat 2 of the sliding seat 1. The extra length accommodation case 35 is formed in a laterally oriented "J" shape, but vertically inverted from the extra length accommodation case 15 according to the first embodiment, and includes a lower straight line portion 36 and a bypass 37 at a top portion. A sliding groove 39 (shown in FIG. 10) is provided along the entire length on the bottom end of the lower straight line portion 36 and an insertion opening 38 of the seat harness 7 is provided at a top and front end of the bypass 37 at the top portion. The wire harness 30 passing through the insertion opening 38 is moved rearward within the bypass 37, is bent at a rear end bending portion 37a, and then advances forward within the lower straight line portion 36.

Figure 10:
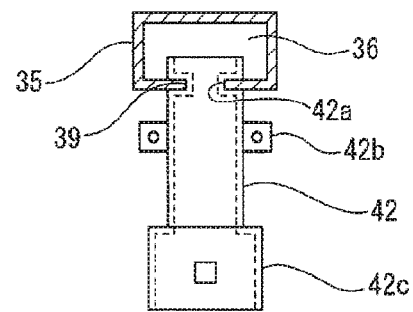
FIG. 10 is a schematic diagram of a slider.

As shown in FIG. 10, a slider 42 is slidably mounted to the sliding groove 39 of the extra length accommodation case 35 which moves accompanying the front/back displacement of the sliding seat 1. The slider 42 is a squared tubular shape through which the wire harness 30 passes, and recess portions 42a slidably fitted to two side edges of the slider sliding groove 39 are provided on the top portion of the slider 42. The lower portion of the slider 42 projects downward from the bottom end surface of the extra length accommodation case 35 and lower fixing portions 42b are fixated to the seat rail 5, and a connector holder portion 42c is provided further below the fixing portions 42b.

The wire harness 30 passing through the bypass 37 within the extra length accommodation case 35 is inserted through the upper end opening of the slider 42 mounted to the slider sliding groove 39 of the lower straight line portion 36, and a connector 43 connected to the lower end is engaged and fixated to the connector holder portion 42c. The connector 43 provided to a forefront end of the wire harness 30 is fitted to a connector 45 which is a terminal of the branch wire 20b of the floor harness 20 wired below the seat rail 5. Other configurations are similar to the first embodiment and descriptions thereof are omitted.

Figure 11A:
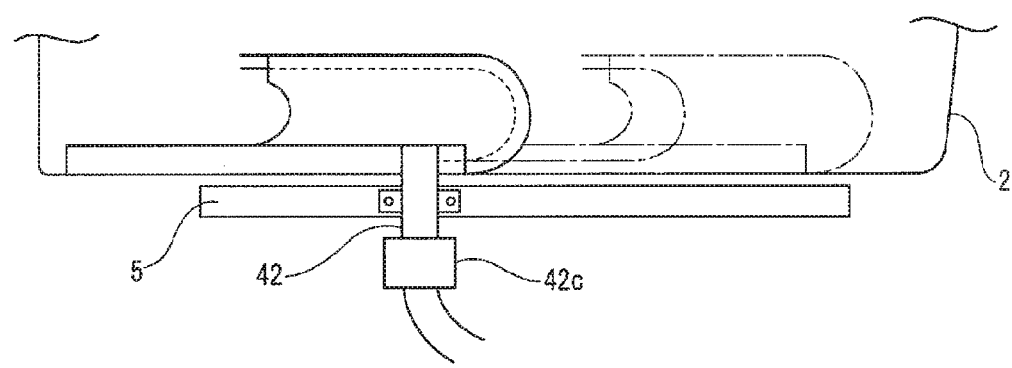
FIG. 11A is a front view of a state where an extra length accommodation case according to the second embodiment is mounted to a sliding seat and the slider is mounted to a seat rail.
Figure 11B:
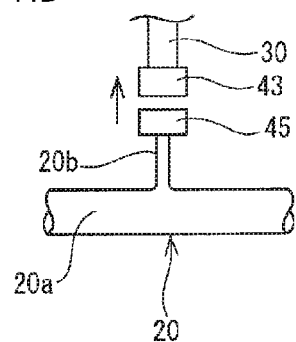
FIG. 11B is a schematic view illustrating a connection of a wire harness to a floor harness.
Figure 12A:
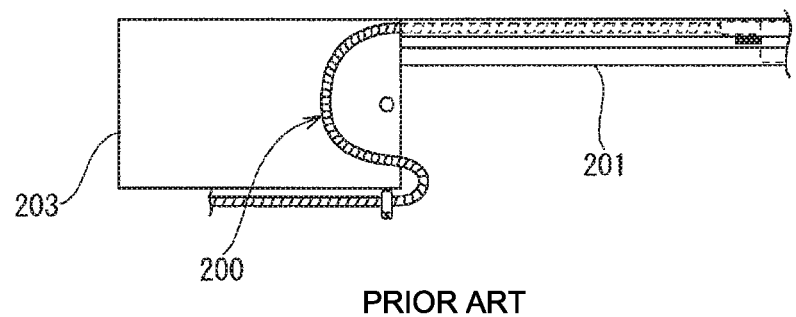
FIGS. 12A and 12B show a conventional example.
Figure 12B:
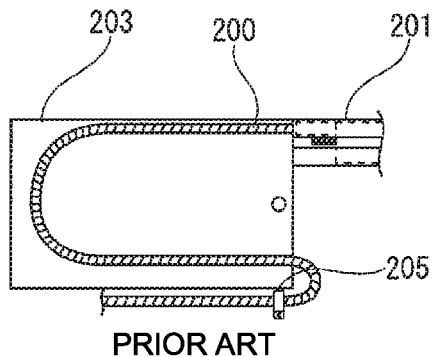
Figure 13:
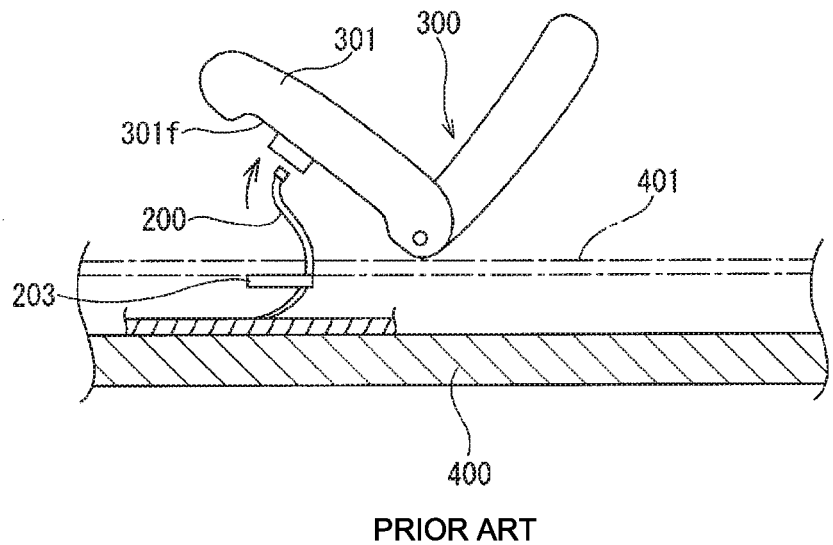
FIG. 13 shows issues with the conventional example.

In the routing structure according to the second embodiment, the extra length accommodation case 35 fixated to the sliding seat 1 moves accompanying the front/back displacement of the sliding seat 1, however, the slider 42 does not move since the slider 42 is fixated to the seat rail 5. In this way, the slider sliding groove 39 moves with respect to the fixated slider 42 and, as shown in FIG. 11A, while the sliding seat 1 displaces forward and backward, a position of the bending portion of the extra length of the wire harness 30 changes within the extra length accommodation case 35 and follows the front/back displacement.

DESCRIPTION OF REFERENCE NUMERALS

1 Sliding seat
2 Seat
5 Seat rail
7 Seat harness
8, 9, 43, 45 Connector
10, 30 Wire harness
11, 12 Cross member
13 Space
15, 35 Extra wire length accommodation case (extra length accommodation case)
16, 36 Straight line displacement portion
17, 37 Bypass
20 Floor harness
21, 42 Slider

The invention claimed is:

1. A wire harness routing device for a sliding seat wherein a branch wire branching from a trunk wire of a floor harness routed in an automobile is used as a wire harness supplying power to the sliding seat, the wire harness is inserted into an extra length accommodation case, the extra length accommodation case being fixated facing downward to a seat rail to which the sliding seat is slidably mounted and being accommodated in a space between front and back cross members of the automobile immediately below the seat rail and the extra length accommodation case is not arranged below a seat of the sliding seat, the extra length accommodation case is formed in a laterally oriented "J" shape and is provided with a straight line displacement portion on a top portion, and the extra length accommodation case is curved at a front end below the straight line displacement portion and has a shape that includes a bypass extending to a center point in a backfold shape, and the wire harness is inserted from the floor side to an opening provided at a lower rear end of the bypass, and the wire harness is U-turned within the extra length accommodation case and passes through a slider and is drawn out toward the sliding seat side and is connected to a seat harness within the sliding seat, a lower portion of the slider is slidably mounted to a straight line direction slider sliding groove provided on a top end of the extra length accommodation case, and in addition, a top portion of the slider is fixated to the sliding seat, and a wire harness passing through the extra length accommodation case and the slider is sheathed by a sheathing member of a caterpillar-type.

2. A wire harness routing structure for a sliding seat wherein a seat harness routed within the sliding seat mounted to an automobile is extended to an exterior and used as a wire harness supplying power to the sliding seat connecting to a floor harness, an extra length accommodation case to which the wire harness is inserted and U-turned is fixated to a seat of the sliding seat, the extra length accommodation case is formed in a laterally oriented "J" shape and is provided with a straight line displacement portion on a bottom portion, and the extra length accommodation case is curved at a rear end above the straight line displacement portion and has a shape that includes a bypass extending to a center point in a backfold shape, and the wire harness continuous to the seat harness is inserted through the opening provided at an upper front end of the bypass, and a slider to which the U-turned wire harness is inserted is slidably mounted to a slider sliding groove provided at a bottom end surface of the extra length accommodation case, and a connector connected to an end portion of the wire harness is fixated to a connector holder portion provided at a lower end of the slider, a lower portion of the slider is fixated to a seat rail on which the sliding seat is slidably mounted and the connector of the end portion of the wire harness within the connector holder portion of the lower end of the fixated slider is connected to a connector of the floor harness, and the wire harness passing through the extra length accommodation case is sheathed by a sheathing member of a caterpillar-type.

* * * * *